R. I. BURBANK.
Vegetable Cutter.
No. 83,829.
3 Sheets—Sheet 1.
Patented Nov. 10, 1868.
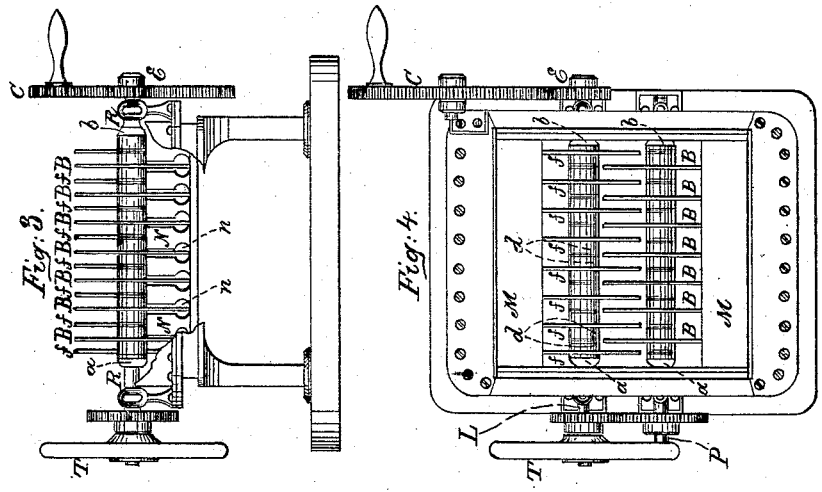
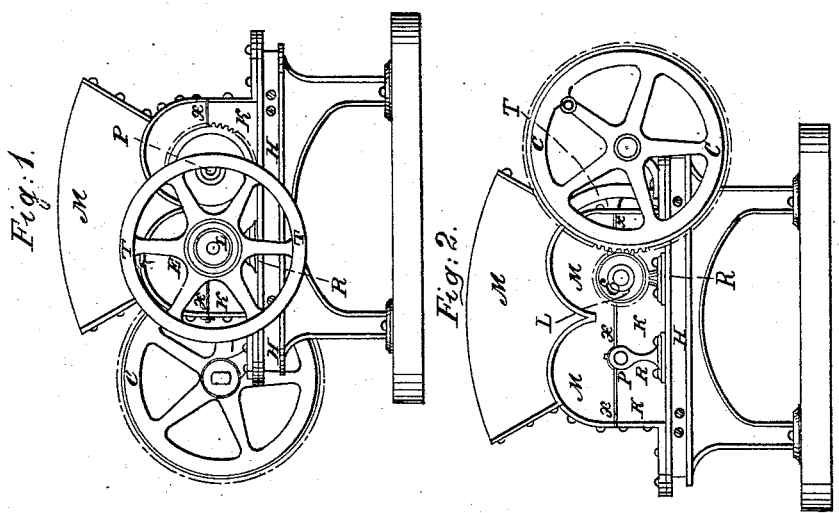
Witnesses.
P. H. Burbank
L. W. Webber
Inventor.
Robert I. Burbank.

R. I. BURBANK.
Vegetable Cutter.
No. 83,829.
3 Sheets—Sheet 2.
Patented Nov. 10, 1868.
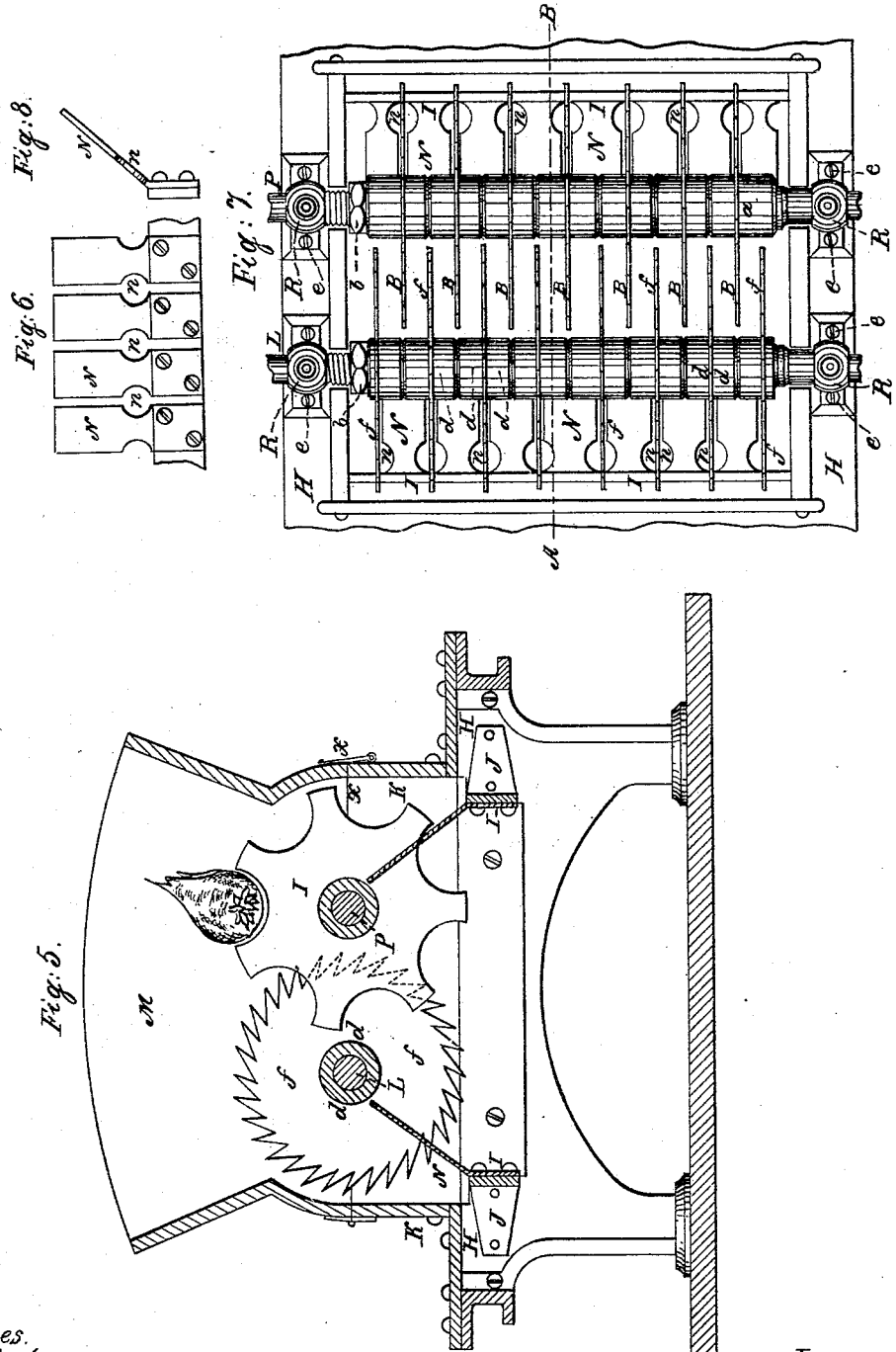

R. I. BURBANK.
Vegetable Cutter.
No. 83,829.
3 Sheets—Sheet 3.
Patented Nov. 10, 1868.
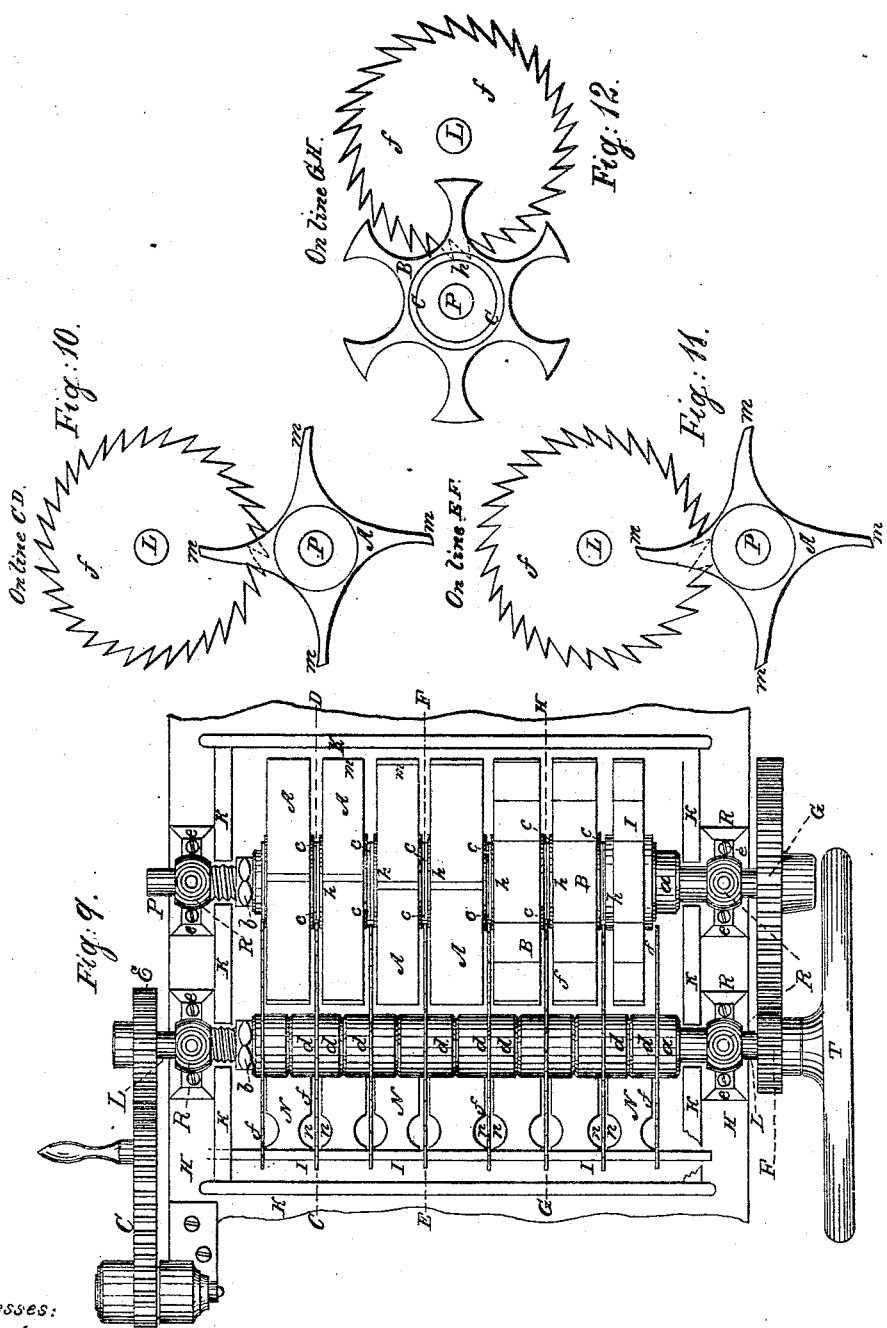

ROBERT I. BURBANK, OF BOSTON, MASSACHUSETTS.

*Letters Patent No. 83,829, dated November 10, 1868.*

IMPROVEMENT IN VEGETABLE-CUTTERS FOR ANIMAL FOOD.

The Schedule referred to in these Letters Patent and making part of the same.

*To all whom it may concern:*

Be it known that I, ROBERT I. BURBANK, of Boston, in the county of Suffolk, and State of Massachusetts, have invented certain new and useful Improvements in Machines for Cutting Vegetables and Feed for Animals, of which the following is a full, clear, and exact description, reference being had to the accompanying drawings, making part of this specification, in which—

Figures 1 and 2, on sheet 1, are end elevations.

Figure 3, on sheet 1, is a side elevation, after a portion of the frame and the hopper has been removed.

Figure 4, on sheet 1, is a plan or top view.

Figure 5, on sheet 2, is a vertical longitudinal section, on the line A B of Figure 7, which is also a top view.

Figure 6, on sheet 2, shows a section of the notched clearers detached, and

Figure 8, an edge view of the same.

Figure 9, on sheet 3, represents a plan or top view of the series of carriers on one shaft, and the series of saws on the other shaft, as I design to make and apply them, those shown in figs. 4 and 7 being modifications of my invention, and which may be used instead of the thick carriers which nearly fill the spaces between the saws.

Figures 10, 11, and 12 are sectional elevations of fig. 9, on the lines A B, C D, and E F, respectively.

This invention consists of a series of rotating carriers, A or B, constructed as shown and described, and operating in connection with a series of rotating circular saws, which run between them; also, of a series of notched clearers, N, applied to or combined with a clearer-girt, I, and arranged between the saws, when the notches *n* of such clearers are opposite the saw-teeth, for a special purpose hereinafter stated; also, in providing annular grooves in or between the hubs of the carriers, to insure positive action of the saws.

The object of this invention is to rapidly cut or slice carrots, potatoes, or other vegetables, to be fed to animals, or to cut hay or straw for the same purpose.

For cutting vegetables, the arm-carriers A are arranged on the shaft, in relation to the saws, as shown in fig. 11, but, when cutting hay or straw with this machine, the arm-carriers (if that form alone is used) should be reversed, as shown in fig. 10, so that the curved ends *m* of the arms shall point upward in the direction of the saw-teeth, as they pass between the arms, and thus hold the hay or straw upward against the action of teeth of the rapidly-rotating saws.

When the carriers B are used, no change need be made in their positions, as both sides are alike, and their action is the same for carrying the substances forward to the saws, whichever way they are placed on the shaft.

The carrier-shaft P may be square or round, and if the latter, the carriers should be clamped between a collar, *a*, on one end of the shaft, and a nut, *b*, on the opposite end.

The saws *f* should be clamped in the same or in a similar way, this being a common mode of clamping-devices on shafts.

The carriers are intended for no other purpose but to carry the substances forward to the saws, and the saws are intended for no other purpose but to slice, cut, or sever the vegetables or other substances brought forward by the carriers, each series acting in connection with the other, and each performing its own peculiar function.

No shearing or grinding-operation is performed by or between the saws and the carriers in this machine, as in the bait-mill patented to N. Richardson, June 3, 1862, nor will one series of devices perform what may be performed by the other series, as in the straw-cutter patented to J. Lashbrooks, November 2, 1858.

Either of the different kinds of carriers may be made thin, as shown in figs. 3, 4, and 7, and clearers applied between them, as also shown, but for carrying any substance or vegetable forward to the saws, I prefer thicker carriers, shown in fig. 9, as such thicker carriers, rotating slowly, convey the vegetables more steadily forward and downward, while the teeth of the rapidly-rotating saws quickly sever, cut, or slice them into pieces of uniform size or length, performing a great amount of cutting or slicing by the expenditure of a small amount of power applied to the crank-wheel C, or by a belt or band, running from a pulley on a rotating shaft on to a pulley arranged in place of the crank-wheel.

Instead of the gears C and E, for-increasing the rotating velocity of the saw-shaft and the saws, a belt may be used on the pulleys substituted for the gears, but I prefer the former, as they insure more certain and positive action of the saws to sever the substances brought forward by the carriers operating in connection therewith.

A small gear, F, is fitted and fastened to one end of the saw-shaft, and on one end of the carrier-shaft is a larger gear, G. By this means the latter shaft and the carriers are caused to rotate much slower than the saws.

The slowly-rotating carriers bring the vegetables or other substances steadily forward to the saws, which do all the cutting.

Between the ends H of the frame, and back of the saws, and below the shaft which carries them, a clearer-girt, I, is secured, and from the top of this girt notched clearers N project upward, at an angle, as shown, between the saws, and nearly to the collars *d*, which hold them in position.

Clearers have been used before for similar purposes, but clearers with notches *n*, like those shown in the drawings, I consider new.

The notches in the clearers are opposite the saw-teeth, and no lateral action of the saws can bring the teeth into contact with such notched clearers, to injure the teeth of the saws.

It will be observed that annular grooves *c* are formed between the ends of the hubs $h$ of the carriers, by removing a portion of each hub, or by equivalent means, and that the teeth of the saws running in these grooves extend in towards the carrier-shaft beyond the surfaces or peripheries of the hubs.

This insures a positive action of each saw running in such groove, to perfectly sever all proper substances brought forward and downward by the carriers, and no vegetable or other substance within the cutting-capacity of the saw-teeth can pass downward between the saws and grooved hubs of the carriers without being completely severed by the teeth of the saws, the hubs at each side of the grooves forming shoulders, to prevent, as much as possible, the passage of the substances beyond such shoulders, in toward the shaft P or the hubs of the carriers.

The collars $d$ between the saws are perfectly made, in two or more parts or sections, so that other saws may be arranged between those already shown, and corresponding carriers, and of a suitable thickness on the carrier-shaft to run between all the saws, thereby providing for cutting vegetables or other substances into thinner or shorter pieces. This is of considerable importance in cutting apples, or potatoes, or other vegetables for culinary purposes, and renders the machine more extensively available, and operative for a wider range of useful purposes.

Instead of fastening the clearer-girt I to the ends of the frame, by screws passing into ears J, as shown in fig. 5, I contemplate fastening or applying such girt by sliding the ends downward in vertical grooves made in the frame, as shown at S in fig. 9, so that when the number of saws is multiplied, to cut or slice finer, or in smaller pieces, the girt I and the wide clearers may be easily removed, and a girt of narrow clearers substituted, which will come between all the saws on the shaft L, however numerous such saws may be.

When the saws on the shaft L are near together, say about one-fourth of an inch apart, the notched clearers are of considerable importance, as small fragments of the substance being cut or sliced are liable to pass upward between a saw and the edge of a clearer. This springs the saw off towards and into sudden contact with the next clearer, and, if the edges of the clearers were straight, the saw-teeth would catch on the clearers, and injure both the clearers and the teeth.

It will therefore be readily seen that the notches in the clearers allow the saws to spring laterally without injury to the teeth.

The vegetables or other substances are placed in a hopper, M, and power applied to turn the large gear-crank-wheel, C, which gears into the small gear, E, on the end of the saw-shaft.

This large gear, operating the small one and the shaft L, imparts a rapid rotating motion to the saws, the teeth of which remove a portion of the vegetable brought forward by the slower-rotating carriers, each saw cutting a kerf in the vegetable, and the divided portions pass freely downward between the saws.

The hopper is hinged to a casing, K, fastened to the top of the frame, the two parts being divided horizontally on the line $x$, at or near the centres of the shafts L and P, so that by raising one end of the hopper, it will swing upward and over, fully exposing the saws and the carriers, which may then be removed, with their shafts, for any change or alteration desired, by simply releasing the screws $e$, which hold the shaft-stands R to the top of the frame.

On one end of the saw-shaft L is a balance-wheel, T, to retain the rotary motion of the shaft and the saws. This saw-shaft being the most rapid mover, produces the best effect of the retaining-power of the wheel, as its momentum is in proportion to its rotating velocity.

Having fully described my invention, its nature, and its uses,

What I claim, and desire to secure by Letters Patent, is—

1. A series of rotating carriers, A or B, constructed as shown and described, and operating in connection with a series of rotating circular saws, in the manner and for the purpose specified.

2. A series of notched clearers, N, constructed, applied, and arranged for operation, as and for the purpose set forth.

3. The combination of all the operative parts specified, when arranged to operate substantially as and for the purpose set forth.

R. I. BURBANK.

Witnesses:
P. C. BURBANK,
L. W. WEBBER.